United States Patent Office

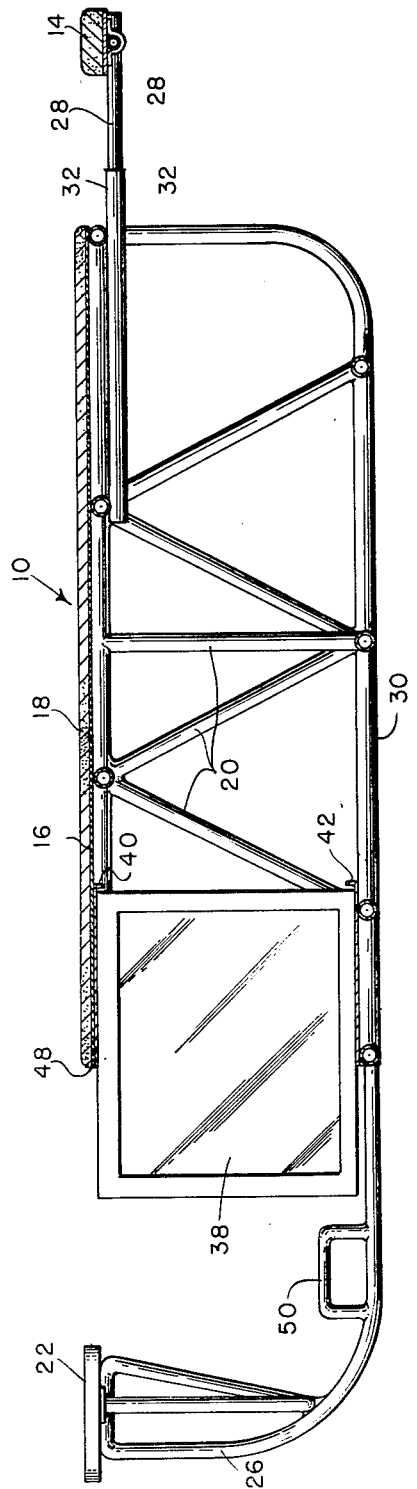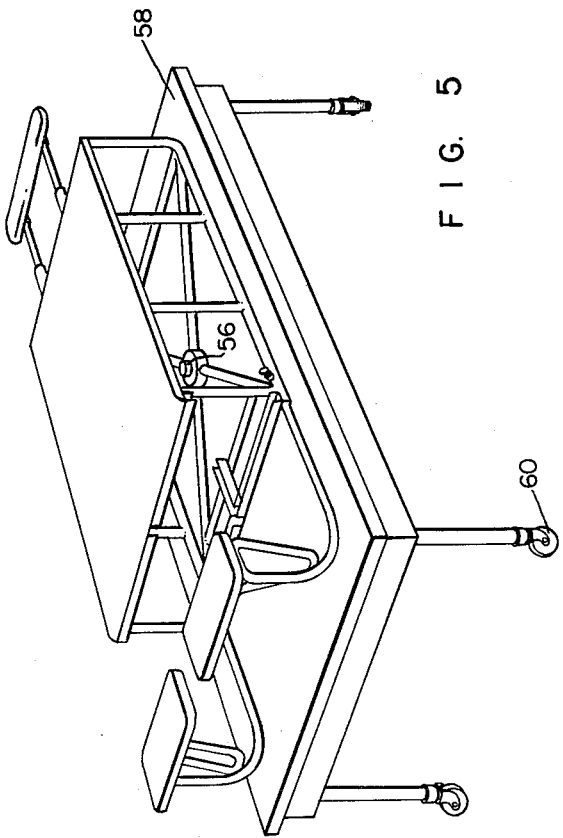

3,165,630
Patented Jan. 12, 1965

3,165,630
TABLE FOR HOLDING AND POSITIONING A FEMALE SUBJECT AND FILM DURING BREAST X-RAY EXPOSURES
John S. Bielat, Lexington, and Herbert J. Frede, Framingham, Mass., assignors to Polaroid Corporation, Cambridge, Mass., a corporation of Delaware
Filed June 13, 1961, Ser. No. 116,730
3 Claims. (Cl. 250—58)

This invention relates to radiography and, more specifically, to methods and apparatus useful in positioning and holding the subject and X-ray film during radiographic exposure.

Radiographic methods have been used in the past for detecting tumorous growths beneath the skin. In a particular application, commonly known as mammography, such methods have been used in the detection of internal growths, such as breast tumor, cancer and other growths, in the breasts of the adult female. The conventional technique in making diagnostic breast X-rays is to take a series of four exposures, two "anterior-posterior" or "AP," made through the breasts from the upper to the lower side, and two "lateral," made through the breasts from the center toward the side. In order to achieve satisfactory diagnostic visualization using known materials and techniques, it has been necessary in the past to expose the subject to a large amount of radiation. Due mainly to the radiation hazard and the inability of conventional X-ray materials to distinguish nonpalpable growths without using excessively high radiation levels, breast X-rays normally were not taken unless the likelihood that a growth existed had been previously established.

As a result of recent improvements in the film and other materials used in making X-rays, many of the previous objections and inadequacies have been overcome. For example, exposures may be made with the materials used in the Type 3000-X radiographic packets, manufactured by the Polaroid Corporation of Cambridge, Massachusetts, using less than one-fiftieth the amount of radiation previously required. Consequently, a complete four-exposure series may be made with such low intensities of radiation that any hazardous effect thereof is negligible. Since film of the above type will also distinguish nonpalpable growths in the breasts with an extremely small amount of radiation, it is now apparently feasible to use mammography as a diagnostic tool on a mass scale.

If breast X-rays are to be used in mass, clinical applications, it is desirable that the subject and film be positioned and held so that all exposures may be made quickly and easily. Commonly used techniques in the past have required the subject to assume uncomfortable positions and to be repositioned after each exposure. Such techniques were necessarily time-consuming and often inaccurate.

Accordingly, it is a principal object of the present invention to provide a novel method for holding and positioning a subject and film during radiographic exposure.

A further object is to provide a method particularly suited for holding and positioning subjects while breast X-rays are taken and which allows both AP and lateral exposures to be taken without repositioning the subject.

Another object is the provision of apparatus for holding and positioning during radiographic exposure both an X-ray cassette and a subject of whom breast X-rays are being taken.

Other objects of the invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a side elevational view in vertical section on the line 4—4 of FIG. 1, showing an X-ray cassette in position for taking a lateral exposure; and FIG. 5 is a perspective view of the apparatus of FIG. 1 slightly modified to be pivotally mounted on a table.

Figure 1:
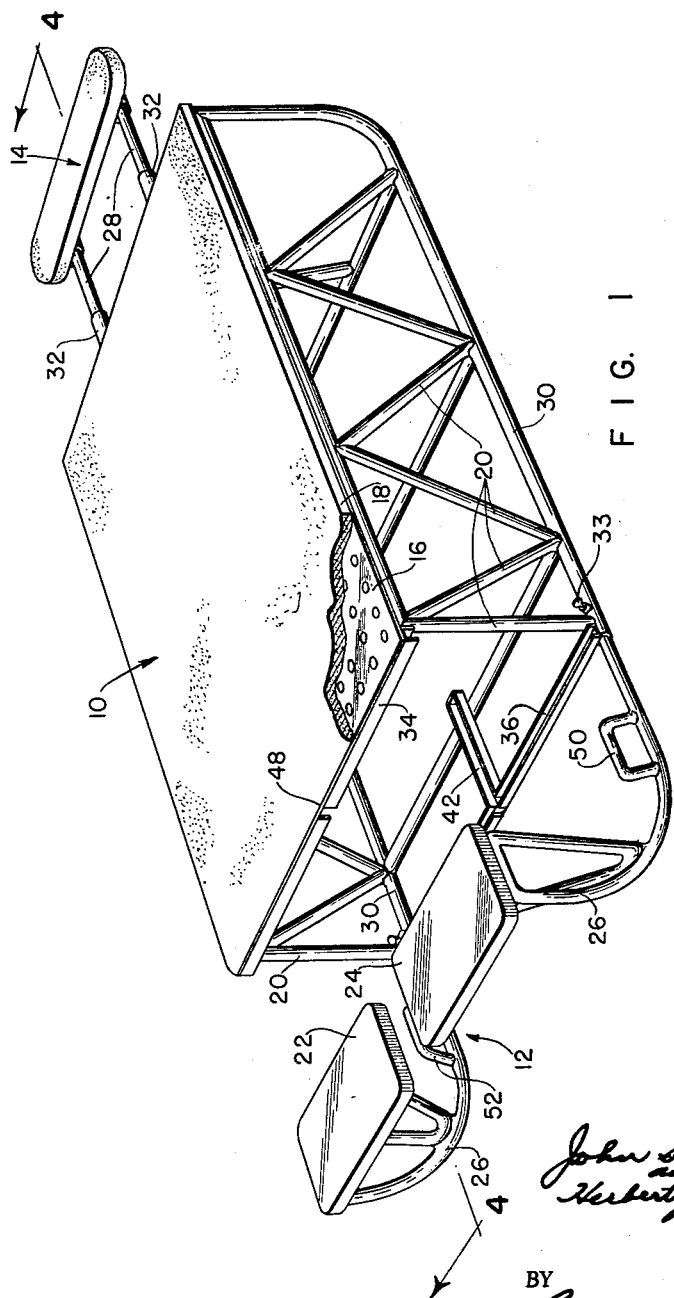
FIGURE 1 is a perspective view of apparatus of the present invention with a portion of the top covering broken away.

Referring now to the drawings, in FIG. 1 is seen a preferred embodiment of the apparatus of the invention comprising a body-supporting surface 10, a head-supporting surface 12, and a foot-supporting surface 14. Each of the supporting surfaces is preferably constructed of a rigid material such as metal, wood, or the like and may be covered with a resilient material such as sponge rubber. As seen in FIG. 1, body-supporting surface 10 comprises a perforated metal plate 16 covered with a resilient layer 18. The perforations shown in plate 16 are optionally present to decrease the weight of the apparatus, thus allowing greater ease in handling. Body-supporting surface 10 is vertically supported by a rigid structure such as supports 20 of a material preferably both light and rigid, such as aluminum tubing. Head-supporting surface 12 may comprise a single surface or two surfaces 22 and 24 spaced slightly apart near the longitudinal axis of the table, as in conventional constructions of medical tables intended to support patients in a face-down position. Surface 12 is held by suitable supports 26 which, as shown, may comprise one or more pieces of suitably shaped aluminum tubing. Foot-supporting surface 14 is held by supports 28.

It is desirable that head-supporting surface 12 and foot-supporting surface 14 be movable with respect to body-supporting surface 10 to allow for adjustment of the apparatus for different sized subjects. The tubing of supports 26 may be of smaller diameter than the tubing of horizontal supports 30 so as to be slidingly engageable therewith. Similarly, tubing 32, fixedly attached to body-supporting surface 10, or its supporting members, may be provided to allow slidable movement of supports 28 therein. Suitable means such as set screws 33 may be provided for rigidly holding the various sections with respect to one another after adjustment.

The apparatus is provided with means for holding radiographic film with respect to the position of the subject so that both AP and lateral exposures may be made while the subject remains in the same position. Since X-ray film is normally held by a cassette designed for that purpose, the means for holding the film may conveniently comprise structure suitable for holding a conventional X-ray cassette in the desired positions. Such structure may be adjustable clips or brackets, for example, or a rigid structure such as the illustrated channel members.

Figure 2:
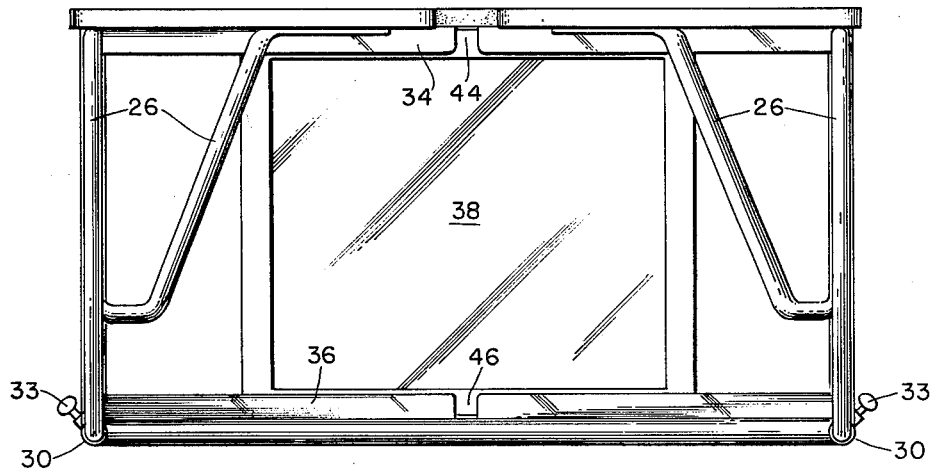
FIG. 2 is a front elevational view of the apparatus of FIG. 1, showing an X-ray cassette in position for making an AP exposure.

Upper channel 34 and lower channel 36 extend laterally across the table substantially in line with the forward edge 48 of body-supporting surface 10. The distance between the inner surfaces of channels 34 and 36 is such that an X-ray cassette 38, holding the film on which the exposure is to be made, may be slidingly inserted therebetween and held as seen in FIG. 2. Cassette 38 is a conventional device, well-known in the art, for holding X-ray film and comprises a rigid, substantially rectangular and relatively thin structure adapted to enclose the film and/or other materials used in conjunction therewith, such as grids or intensifying screens. Extending perpendicularly rearward from channels 34 and 36, substantially parallel to the longitudinal axis of the table, are channels 40 and 42. Portions of channels 34 and 36 are cut away to form openings 44 and 46, allowing insertion of cassette 38 in the position shown in FIG. 4. The clearance between cassette 38 and channels 40 and 42 may be made such that cassette 38 will be held in position although inserted only a few inches between the channels.

Figure 3:
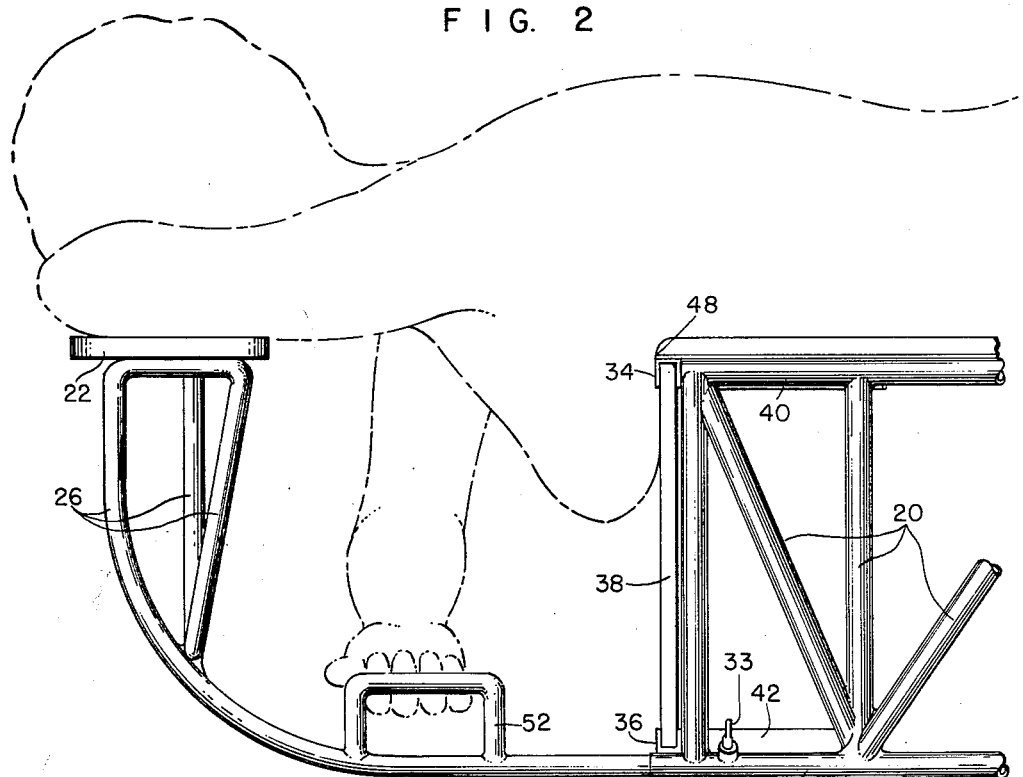
FIG. 3 is a fragmentary side view of the apparatus of FIG. 1 showing an X-ray cassette and subject in position for AP exposure.

The subject to be X-rayed assumes the position shown in FIG. 3, lying face down with the body supported by surface 10, breasts forward of edge 48, head supported by surface 12 and feet supported by surface 14. Handles 50 and 52 may be provided to be grasped by the subject so that edge 48 will press more firmly against the body and the breasts will protrude a maximum distance over cassette 38. The hands and arms may be placed under the head on surface 12, or at the sides of the apparatus if handles 50 and 52 are grasped, both of which positions are shown in FIG. 3.

With cassette 38 held by channels 34 and 36, behind the breasts of the subject as seen in FIG. 3, the anterior-posterior exposures may be made with an X-ray machine positioned forwardly of the table. For making the lateral exposures, cassette 38 is inserted through openings 44 and 46 between the breasts of the subject, in the position of FIG. 4, with the X-ray machine positioned at the side of the table. It is to be noted that cassette 38 may be removed and reinserted in either position without moving the subject.

The apparatus may of course be provided with legs in a conventional manner to give added height, or it may be placed on any convenient supporting surface. If legs with casters or wheels 60 are provided, the table, with the subject in position, may be easily positioned with respect to the X-ray machine to permit all four exposures to be taken quickly and conveniently with the same machine. The apparatus of the invention may also be pivotally mounted, as with a conventional swivel 56, on a table 58, as shown in FIG. 5, so that the apparatus may be turned with respect to the X-ray machine between the positions for making anterior-posterior and lateral exposures.

From the foregoing description, it is apparent that the present invention makes possible the positioning and holding of the subject and film with respect to an X-ray machine which allows breast X-rays to be made quickly and easily. The subject is in a comfortable position and remains in the same position while all four exposures are made. The X-ray cassette is held by the same apparatus which holds the subject, allowing the respective positions of the cassette and subject to be easily and accurately fixed. The apparatus may be mounted in such a way that it may be easily repositioned with respect to the X-ray machine to allow all exposures to be made with the same machine, again without the necessity of changing the subject's position.

It is also evident that taking breast X-rays according to the method or with the apparatus of the present invention allows convenient and exact repositioning of the subject and film if it is desired to take subsequent exposures of the same area from the same angle. Also, positioning of the X-ray tube or machine is greatly facilitated since all exposures may be made horizontally, eliminating the necessity of positioning the machine for exposures from other angles.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. Apparatus for holding and positioning a female subject and film during breast X-ray exposures whereby said subject and film may be subsequently placed in the same relative positions to obtain repeatable exposures of the identical area, said apparatus comprising, in combination:
   (a) a substantially flat, horizontal surface adapted to support at least a portion of the body of said subject during said exposures;
   (b) a rigid leading edge associated with said surface which the breasts of said subject overhang when the subject is positioned upon said surface;
   (c) first holding means rigidly affixed with respect to said leading edge and adapted to engage and hold an X-ray cassette holding a first X-ray film in a first position, wherein an edge of said first film is closely adjacent and parallel to said leading edge and said first film is positioned below the plane of said surface and in a plane perpendicular thereto; and
   (d) second holding means rigidly affixed with respect to said leading edge and adapted to engage and hold an X-ray cassette holding a second X-ray film in a second position, wherein an edge of said second film is closely adjacent and perpendicular to said leading edge and said second film is positioned below the plane of said surface and in a plane perpendicular to that of said first film.

2. The invention according to claim 1 and including manually engageable handles positioned below the plane of said surface and rigidly affixed with respect thereto, whereby said subject may pull upward on said handles, thereby forcing the body more tightly against said leading edge.

3. The invention according to claim 2 wherein said first and second holding means comprise spaced-apart channel members, the channel members of said second holding means being attached to and extending perpendicularly rearward, with respect to said leading edge, from the channel members of said first holding means.

References Cited in the file of this patent

UNITED STATES PATENTS

| | | |
|---|---|---|
| 1,599,434 | Rose | Sept. 14, 1926 |
| 2,651,725 | McFarland | Sept. 8, 1953 |
| 2,876,359 | Plymale | Mar. 3, 1959 |
| 3,072,788 | Oller | Jan. 8, 1963 |

OTHER REFERENCES

"Cradle for Radiography of Female Breast," by J. Getshon-Cohen, M.D. from "Radiography and Clinical Photography" volume 13, No. 1, April 1937, pp. 14 and 15.

"Roentgenography of the Breast" by V. Kremens, M.D. from "The American Journal of Roentgenology, Radium Theraphy and Nuclear Medicine," volume 80, No. 6, December 1958, pp. 1005 to 1013.